United States Patent
Fukazawa et al.

(10) Patent No.: US 11,694,231 B2
(45) Date of Patent: Jul. 4, 2023

(54) ADVERTISEMENT PRESENTATION SYSTEM AND ADVERTISEMENT PRESENTATION METHOD

(71) Applicant: TOYOTA JIDOSHA KABUSHIKI KAISHA, Aichi-ken (JP)

(72) Inventors: Kazuhiro Fukazawa, Toyota (JP); Takashi Hayashi, Toyota (JP)

(73) Assignee: TOYOTA JIDOSHA KABUSHIKI KAISHA, Aichi-ken (JP)

(*) Notice: Subject to any disclaimer, the term of this patent is extended or adjusted under 35 U.S.C. 154(b) by 227 days.

(21) Appl. No.: 17/126,028

(22) Filed: Dec. 18, 2020

(65) Prior Publication Data
US 2021/0217057 A1 Jul. 15, 2021

(30) Foreign Application Priority Data
Jan. 15, 2020 (JP) .............................. JP2020-004769

(51) Int. Cl.
*G06Q 30/00* (2023.01)
*G06Q 30/0251* (2023.01)
*G06Q 10/10* (2023.01)
*G06Q 30/0273* (2023.01)
*B60R 11/02* (2006.01)
*G09F 21/04* (2006.01)
*G09F 9/30* (2006.01)
(Continued)

(52) U.S. Cl.
CPC ...... *G06Q 30/0265* (2013.01); *B60R 11/0229* (2013.01); *G06Q 10/10* (2013.01);
(Continued)

(58) Field of Classification Search
None
See application file for complete search history.

(56) References Cited

U.S. PATENT DOCUMENTS 10,783,559 B1* 9/2020 Tran .......................... G09F 9/00
2002/0116717 A1* 8/2002 Eller ...................... G09F 27/00
725/147
(Continued)

FOREIGN PATENT DOCUMENTS

JP H10166936 A 6/1998
JP 200330534 A 1/2003
(Continued)

*Primary Examiner* — Naresh Vig
(74) *Attorney, Agent, or Firm* — Hauptman Ham, LLP

(57) ABSTRACT

An advertisement presentation system includes at least one display device that is detachably provided to a vehicle, an information processing device, and a management server. The information processing device is configured to acquire advertisement information representing an advertisement, and to output the acquired advertisement information to the display device. The display device is configured to present the advertisement information output from the information processing device such that the advertisement information is directed outward from the vehicle. The information processing device is configured to transmit task report information representing a presentation task report for the advertisement information by the display device to the management server. The management server is configured to determine remuneration to cover both incurred data communication costs and advertising costs associated with presentation of the advertisement information, in accordance with the task report information transmitted from the information processing device.

20 Claims, 13 Drawing Sheets

(51) Int. Cl.
*H04L 12/14* (2006.01)
*B60R 11/00* (2006.01)

(52) U.S. Cl.
CPC ........... *G06Q 30/0273* (2013.01); *G09F 9/30* (2013.01); *G09F 21/048* (2013.01); *B60R 2011/0003* (2013.01); *B60R 2011/004* (2013.01); *B60R 2011/0049* (2013.01); *H04L 12/141* (2013.01)

(56) References Cited

U.S. PATENT DOCUMENTS

| | | | |
|---|---|---|---|
| 2010/0179878 A1* | 7/2010 | Dawson | G06Q 30/0265 705/14.62 |
| 2011/0093330 A1* | 4/2011 | Burckart | G06Q 30/0265 705/14.62 |
| 2014/0249913 A1* | 9/2014 | Endo | G06Q 30/0246 705/14.45 |
| 2018/0053215 A1* | 2/2018 | e Costa | G06Q 30/0267 |
| 2019/0355019 A1 | 11/2019 | Takanashi et al. | |
| 2020/0410549 A1* | 12/2020 | Buchalter | G06Q 30/0246 |
| 2021/0110426 A1* | 4/2021 | Hibbard | G06Q 30/0251 |

FOREIGN PATENT DOCUMENTS

| | | | |
|---|---|---|---|
| JP | 200937044 A | 2/2009 | |
| JP | 5601423 B2 | 10/2014 | |
| JP | 201892385 A | 6/2018 | |
| WO | 2018105217 A1 | 6/2018 | |

\* cited by examiner

FIG.3

| ADVERTISEMENT ID | ADVERTISEMENT INFORMATION |
|---|---|
| 00001 | XXX |
| 00002 | YYY |
| ... | ZZZ |
| ... | ... |
| ... | WWW |

FIG.4

| VEHICLE ID | ADVERTISEMENT INFORMATION | TASK REPORT INFORMATION | COMMUNICATION COST |
|---|---|---|---|
| 00001 | XXX | ... | ... |
| 00002 | YYY | ... | ... |
| ... | ZZZ | ... | ... |
| ... | ... | ... | ... |
| ... | WWW | ... | ... |

FIG.5

| VEHICLE ID | ADVERTISEMENT INFORMATION | TASK REPORT INFORMATION | COMMUNICATION COST | ADVERTISING FEE | REMUNERATION INFORMATION |
|---|---|---|---|---|---|
| 00001 | XXX | ... | ... | AAA | aaa |
| 00002 | YYY | ... | ... | BBB | bbb |
| ... | ZZZ | ... | ... | CCC | ccc |
| ... | ... | ... | ... | ... | ... |
| ... | WWW | ... | ... | DDD | ddd |

ADVERTISEMENT PRESENTATION SYSTEM AND ADVERTISEMENT PRESENTATION METHOD

CROSS-REFERENCE TO RELATED APPLICATION

This application is based on and claims priority under 35 USC 119 from Japanese Patent Application No. 2020-4769 filed on Jan. 15, 2020, the disclosure of which is incorporated by reference herein.

BACKGROUND

Technical Field

Technology disclosed herein relates to an advertisement presentation system and an advertisement presentation method.

Background Art

Systems configured to present an advertisement from a vehicle are known. For example, Japanese Patent No. 5601423 describes presenting an advertisement outward from a vehicle. In Japanese Patent No. 5601423, a peripheral light emitting panel or light-transmitting display panel is employed as a vehicle display section. Specifically, in Japanese Patent No. 5601423, a thin plate shaped vehicle body display section is affixed to the hood, left or right side panels, the roof, or a trunk lid configuring the exterior profile of the vehicle, and a transparent protective layer (for example, a resin material such as a polycarbonate) is provided to an outer surface of the affixed vehicle body display section.

SUMMARY

Technical Problem

In cases such as that disclosed in Japanese Patent No. 5601423 in which advertising is performed using a vehicle, it is necessary to purchase a dedicated vehicle with a pre-installed display device. However, cases may arise in which it would be preferable to retrofit a display device to an existing vehicle. In such cases, costs are incurred in attaching the display device to the vehicle. Furthermore, once such a display device has been attached to the vehicle, the display device cannot easily be removed from the vehicle, even if so desired. The existence of such issues may explain the lack of popularity of display device-mounted vehicles that use the display device to present advertisements while traveling.

In consideration of the above circumstances, an object of technology disclosed herein is to provide an advertisement presentation system and an advertisement presentation method that are capable of presenting an advertisement from a vehicle mounted with a detachable display device.

Solution to Problem

An advertisement presentation system according to a first aspect includes at least one display device that is detachably provided at a vehicle and that includes a first processor, an information processing device including a second processor, and a management device including a third processor. The second processor of the information processing device is configured to acquire advertisement information representing an advertisement, and to output the acquired advertisement information to the first processor of the display device. The first processor of the display device is configured to present the advertisement information output from the second processor of the information processing device such that the advertisement information is directed outward from the vehicle. The second processor of the information processing device is configured to transmit to the third processor of the management device task report information from the first processor of the display device representing a presentation task report for the advertisement information. The third processor of the management device is configured to determine remuneration to cover both incurred data communication costs and advertising costs associated with presentation of the advertisement information, in accordance with the task report information transmitted from the second processor of the information processing device.

The information processing device of the advertisement presentation system acquires the advertisement information representing an advertisement, and outputs the acquired advertisement information to the display device. The display device presents the advertisement information output from the information processing device such that the advertisement information is directed outward from the vehicle. The information processing device also transmits the task report information representing the presentation task report for the advertisement information by the display device to the management device. The management device determines the remuneration to cover both the incurred data communication costs and advertising costs associated with presentation of the advertisement information in accordance with the task report information transmitted from the information processing device. This enables an advertisement to be presented by a vehicle mounted with a detachable display device. Moreover, since the remuneration to be paid in exchange for presenting the advertisement information covers both the incurred data communication costs and the advertising costs associated with presentation of the advertisement information, the party presenting the advertisement information is able to present the advertisement information without worrying about communication costs.

In an advertisement presentation system according to a second aspect, the display device is a display device provided inside a cabin of the vehicle such that a display face of the display device faces outward from the vehicle. The display device is accordingly less liable to come off than in cases in which the display device is provided to an exterior location of the vehicle.

In an advertisement presentation system according to a third aspect, the at least one display device detachably provided to the vehicle includes a first display device provided at a first location on the vehicle and a second display device provided at a second location on the vehicle. The first display device is configured to present first advertisement information directed outward from the vehicle, and the second display device is configured to present second advertisement information directed outward from the vehicle. Presenting advertisement information that is adapted for a target located at a position corresponding to the direction in which the advertisement is presented further enhances the promotional efficacy.

In an advertisement presentation system according to a fourth aspect, the information processing device is a terminal configured to be operated by an occupant of the vehicle.

This enables advertisement information to be presented from a vehicle even if the vehicle is not mounted with a dedicated onboard device.

In an advertisement presentation system according to a fifth aspect, the second processor of the information processing device is configured to determine a background color of an on-screen display of the display device based on information regarding a body color of the vehicle. This enables the appearance of the vehicle to be improved.

In an advertisement presentation system according to a sixth aspect, the third processor of the management device is configured to transmit the advertisement information to the second processor of the information processing device, the second processor of the information processing device is configured to receive the advertisement information transmitted from the third processor of the management device, and the incurred data communication costs include communication costs arising in the course of as a result of the information processing device receiving the advertisement information. This enables the party presenting the advertisement information to present the advertisement information without worrying about communication costs, even in cases in which a large amount of data is handled in the course of as a result of receiving the advertisement information.

An advertisement presentation method according to a seventh aspect is executed in an advertisement presentation system including at least one display device that is detachably provided at a vehicle and that includes a first processor, an information processing device including a second processor, and a management device including a third processor. The advertisement presentation method includes the second processor of the information processing device acquiring advertisement information representing an advertisement, and outputting the acquired advertisement information to the first processor of the display device, the first processor of the display device presenting the advertisement information output from the second processor of the information processing device such that the advertisement information is directed outward from the vehicle, the second processor of the information processing device transmitting to the third processor of the management device task report information from the first processor of the display device representing a presentation task report for the advertisement information, and the third processor of the management device determining remuneration to cover both incurred data communication costs and advertising costs associated with presentation of the advertisement information, in accordance with the task report information transmitted from the second processor of the information processing device.

Advantageous Effects of Invention

As described above, the technology disclosed herein is capable of presenting an advertisement from a vehicle mounted with a detachable display device.

BRIEF DESCRIPTION OF DRAWINGS

FIG. 3 is a diagram illustrating an example of advertisement information.

FIG. 4 is a diagram illustrating an example of task report information.

FIG. 5 is a diagram illustrating an example of remuneration information.

DETAILED DESCRIPTION

First Exemplary Embodiment

Explanation follows regarding an advertisement presentation system of an exemplary embodiment, with reference to the drawings.

Figure 1:
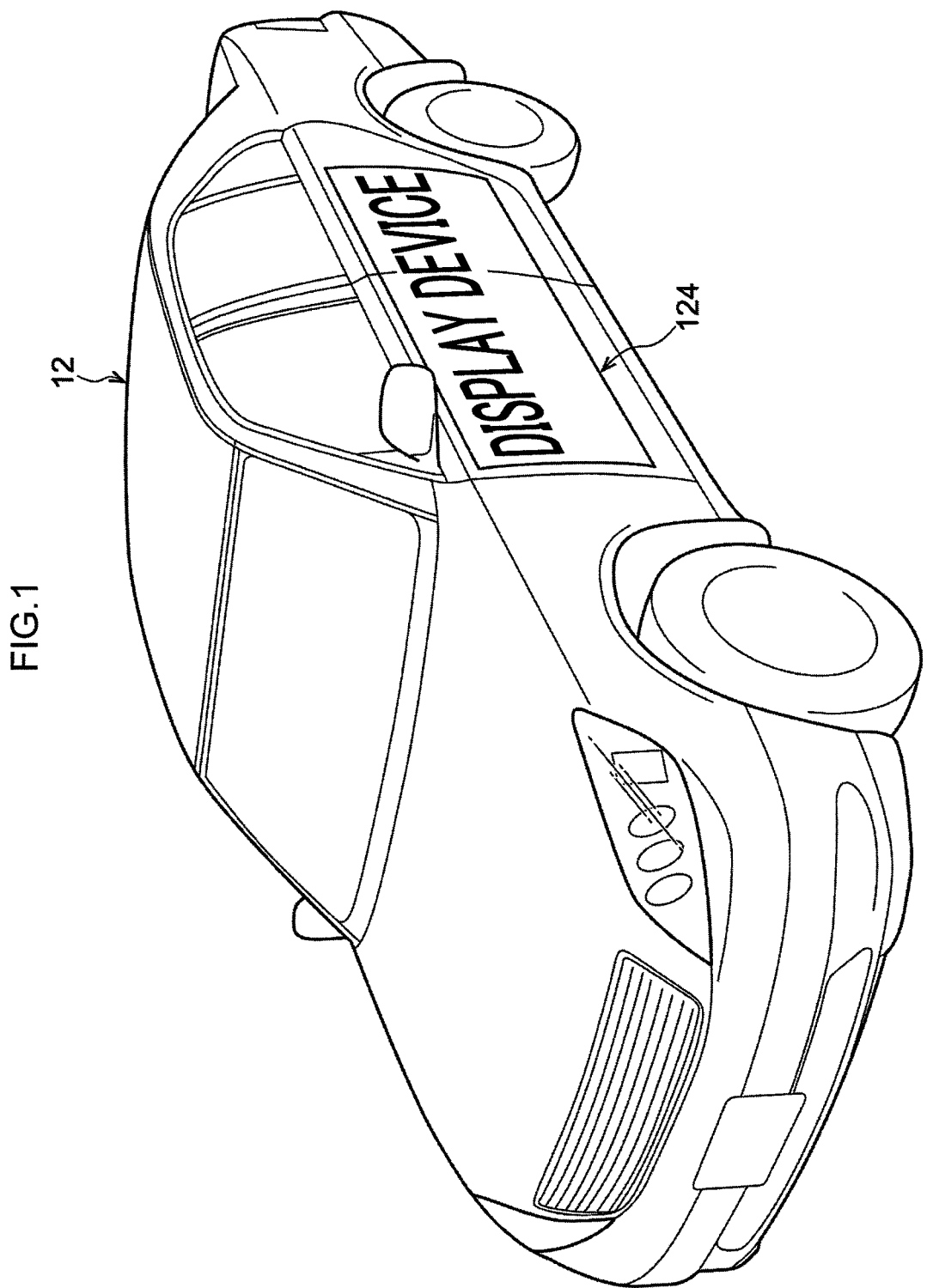
FIG. 1 is a diagram to explain an exemplary embodiment in outline.

FIG. 1 is a diagram to explain the present exemplary embodiment in outline. As illustrated in FIG. 1, a display device 124 that outputs advertisement information is provided to a side face of a body of a vehicle 12. Advertisement information is output from the display device 124. The advertisement information is output from the display device 124 while the vehicle 12 is traveling. The advertisement information output from the display device 124 is seen by people present outside the vehicle 12, and is thus intended to have a promotional effect.

Figure 2:
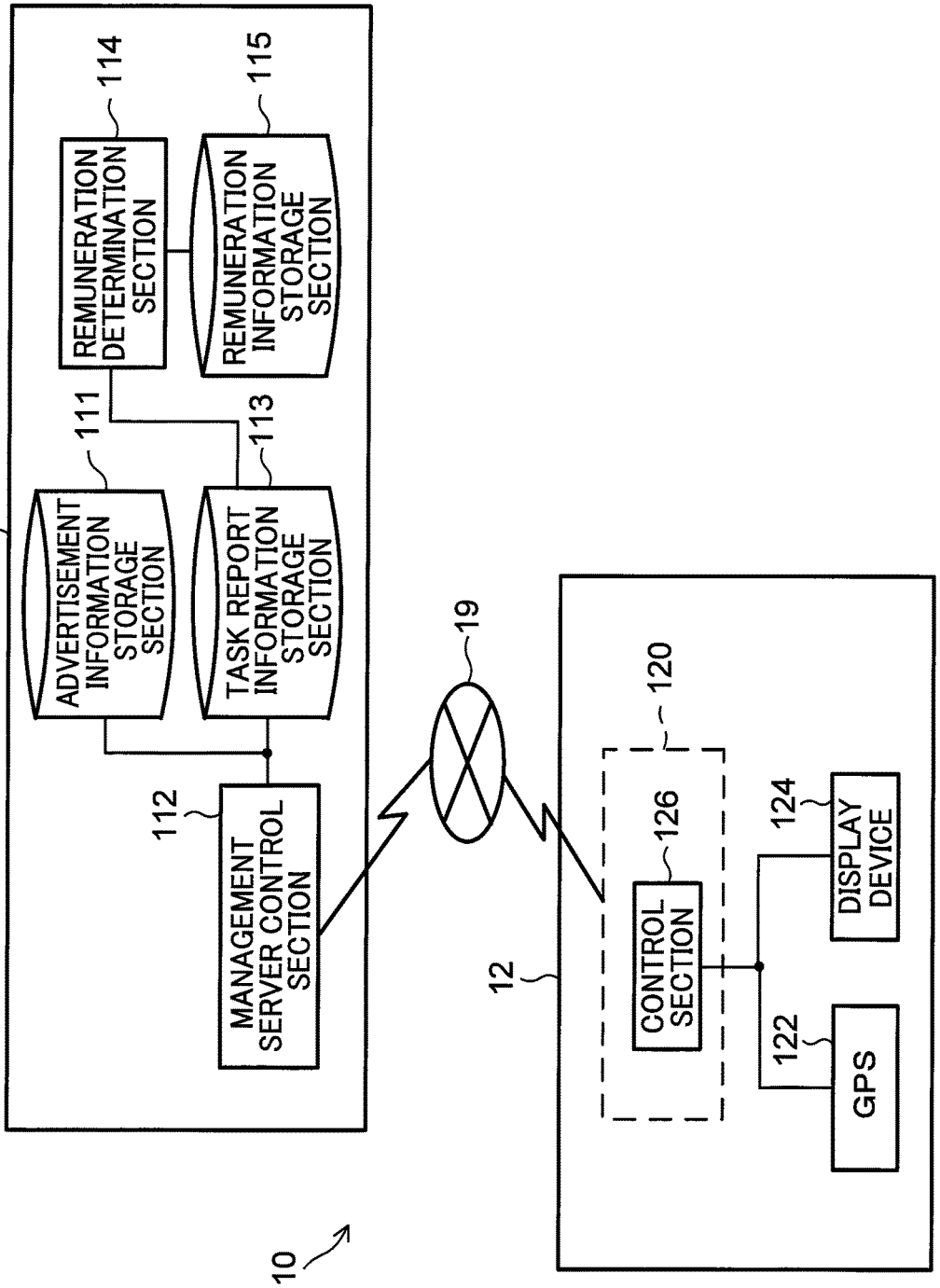
FIG. 2 is a block diagram schematically illustrating an advertisement presentation system according to a first exemplary embodiment.

FIG. 2 is a block diagram illustrating an example of configuration of an advertisement presentation system 10 according to the present exemplary embodiment. As illustrated in FIG. 2, the advertisement presentation system 10 includes a management server 11 serving as an example of a management device, and the vehicle 12. The management server 11 and the vehicle 12 are connected together by a predetermined communication unit 19.

Management Server

As illustrated in FIG. 2, in terms of functionality, the management server 11 includes an advertisement information storage section 111, a management server control section 112, a task report information storage section 113, a remuneration determination section 114, and a remuneration information storage section 115.

Advertisement information to be output from the display device 124 of the vehicle 12 is held in the advertisement information storage section 111. FIG. 3 illustrates an example of the advertisement information held in the advertisement information storage section 111. As illustrated in FIG. 3, the advertisement information may for example be held in a table format. In the table illustrated in FIG. 3, an advertisement ID, this being identification information for identifying the advertisement information, and advertisement information representing the corresponding advertisement are held in association with each other.

The management server control section 112 acquires the advertisement information for any of the plural items of advertisement information held in the advertisement information storage section 111. The management server control section 112 then transmits the acquired advertisement information to an information processing device 120 of the vehicle 12. The processing of the management server control section 112 is described in more detail later.

Information indicating a travel route actually traveled by the vehicle 12 while the advertisement information was being output and the time thereof is held in the task report information storage section 113 as task report information. The task report information storage section 113 holds task report information for respective vehicles, and the task report information is used to calculate advertising fee payments. FIG. 4 illustrates an example of the task report information held in the task report information storage section 113. As illustrated in FIG. 4, the task report information may for example be held in table format. In the table illustrated in FIG. 4, a vehicle ID representing vehicle identification information, advertisement information, task report information, and a communication costs are held in association with each other. Note that the communication costs are data communication costs incurred by the vehicle in the course of as a result of presenting the advertisement.

The remuneration determination section 114 determines a remuneration amount corresponding to the advertising fee for the advertisement information output by the vehicle 12 while traveling in accordance with the task report information for the vehicle 12 held in the task report information storage section 113. Specifically, the remuneration determination section 114 determines a remuneration that covers the data communication costs incurred in the course of acquiring the advertisement information, presenting the advertisement information, and reporting the task report information, as well as advertising costs associated with presentation of the advertisement information.

Remuneration information indicating the remuneration for the vehicle 12 presenting the advertisement information while traveling is held in the remuneration information storage section 115. FIG. 5 illustrates an example of the remuneration information held in the remuneration information storage section 115. As illustrated in FIG. 5, the remuneration information may for example be held in table format. In the table illustrated in FIG. 5, the vehicle ID for identifying the vehicle, advertisement information actually advertised by the vehicle, the task report information representing the presentation task report, the communications cost incurred in the course of this advertising, the advertising costs associated with presentation of the advertisement information, and the remuneration information indicating the remuneration to be paid to a management organization or the like that manages the vehicle, are held associated with each other.

Vehicle

Figure 6:
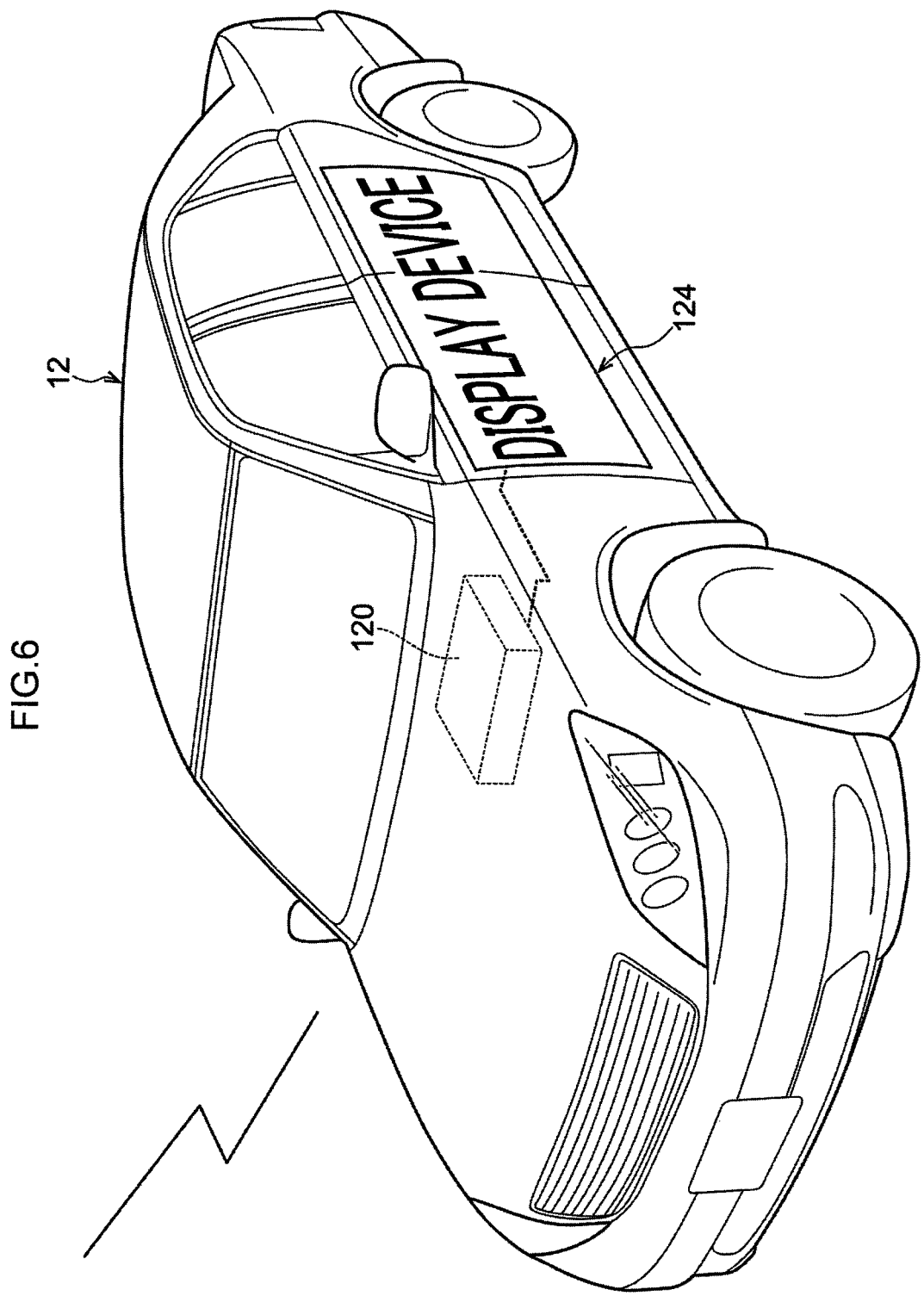
FIG. 6 is a diagram illustrating an example of an information processing device.
Figure 7:
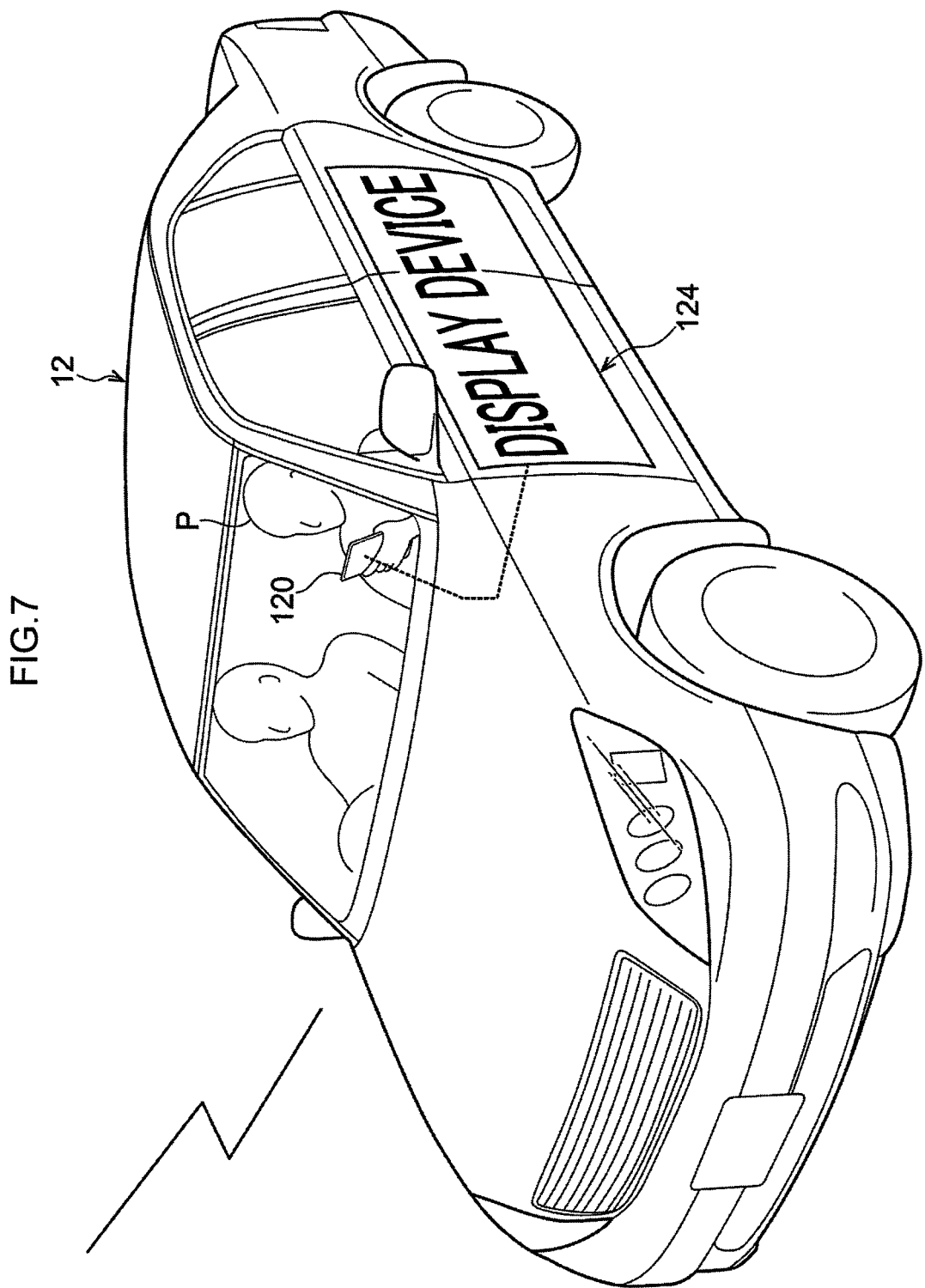
FIG. 7 is a diagram illustrating an example of an information processing device.

As illustrated in FIG. 2, the vehicle 12 includes the information processing device 120, a GPS 122, and the display device 124. Note that the information processing device 120 may be a device that is mounted to the vehicle 12 as illustrated in FIG. 6, or may be a terminal operated by an occupant P present inside the vehicle 12 as illustrated in FIG. 7. For example, in cases in which the information processing device 120 is a smartphone as illustrated in FIG. 7, the display device 124 communicates with the management server 11 through the smartphone. The display device 124 and the smartphone of the occupant may for example be connected by short-range communication such as Bluetooth (registered trademark).

The information processing device 120 exchanges information with the management server 11, and causes the display device 124 to present the advertisement information. As illustrated in FIG. 2, in terms of functionality, the information processing device 120 includes a control section 126.

The control section 126 performs exchange of information between the management server 11, the GPS 122, and the display device 124.

The GPS 122 successively acquires positional information indicating the position of the vehicle 12.

The display device 124 outputs the advertisement information transmitted from the management server 11 such that the advertisement information is directed outward from the vehicle 12. For example, a liquid crystal display may be adopted as the display device 124. The display device 124 of the present exemplary embodiment is configured so as to be attachable and detachable with respect to the vehicle body.

For example, a back face of the display device 124 employs an adhesion method such as suckers, magnets, or stickers (not illustrated in the drawings), such that the display device 124 is attachable and detachable with respect to an exterior location of the vehicle 12. Alternatively, the display device 124 may be wedged into a gap in the body or a window. The display device 124 is thereby configured so as to be attachable and detachable with respect to the vehicle body. In such cases, a mechanism for attachment to the vehicle 12 is not required. This enables the display device 124 to be easily attached to the vehicle 12.

Figure 8:
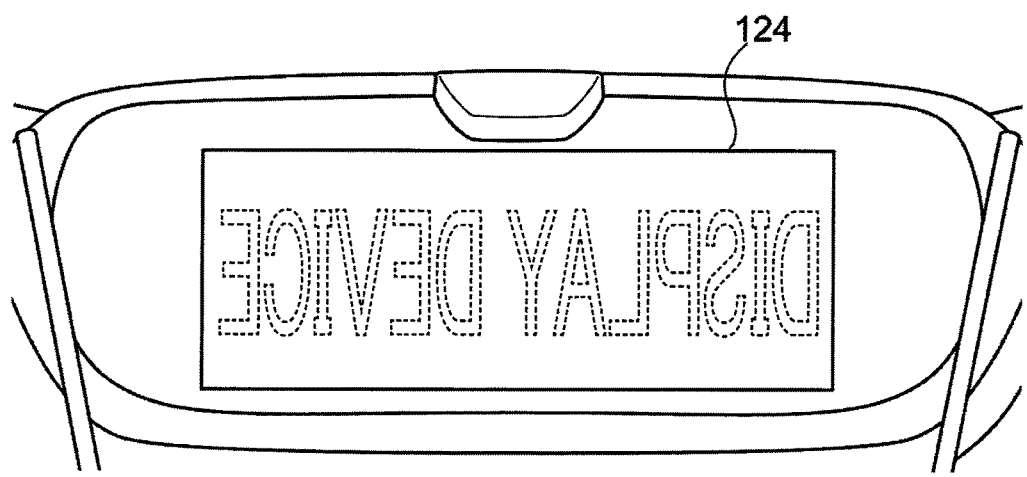
FIG. 8 is a diagram illustrating an example of a display device attached inside a cabin of a vehicle.
Figure 9:
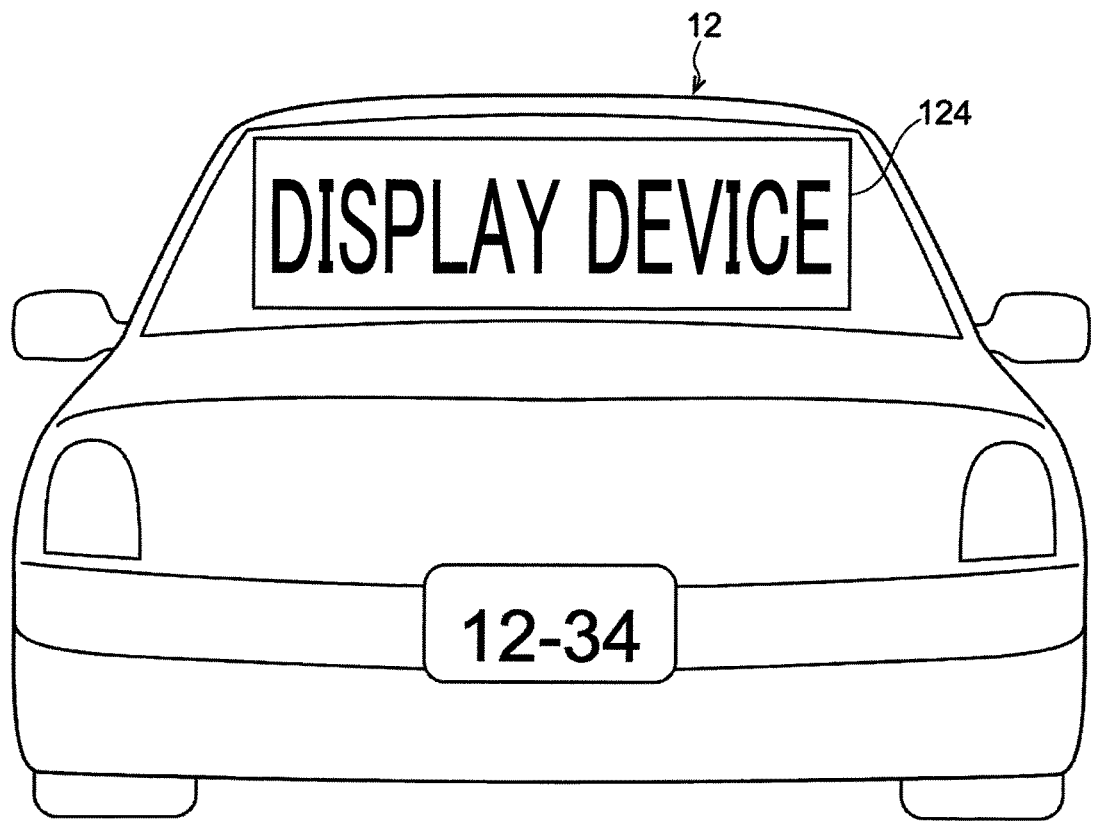
FIG. 9 is a diagram illustrating an example of a display device attached inside a cabin of a vehicle.

Note that as illustrated in FIG. 8 and FIG. 9, the display device 124 may be configured so as to be capable of being attached inside the cabin of the vehicle 12. FIG. 8 is a diagram of a back window of the vehicle 12 as viewed from the cabin interior. FIG. 9 is a diagram of the vehicle 12 as viewed from behind the vehicle 12. In the example illustrated in FIG. 8 and FIG. 9, the display device 124 is attached to window glass, and a display face of the display device 124 is installed facing outward from the vehicle 12. In such cases also, the display device 124 employs a predetermined adhesion method such as suckers, magnets, or stickers (not illustrated in the drawings). Providing the display device 124 inside the cabin of the vehicle 12 means that the display device 124 is less liable to come off than in cases in which the display device 124 is installed to an exterior location of the vehicle 12. Moreover, even supposing the display device 124 provided inside the cabin of the vehicle 12 were to come off, the consequences thereof would be minor. Providing the display device 124 inside the cabin of the vehicle 12 also means that the display device 124 is less liable to be mistaken for a brake light or the like.

The attachment position of the display device 124 may be restricted according to the functionality of the vehicle 12. For example, in cases in which the vehicle 12 includes an electronic interior mirror (not illustrated in the drawings), the display device 124 may be attached to the back window. As another example, in cases in which the vehicle 12 includes an autonomous driving function, the display device 124 may be attached to a front windshield.

The display device 124 includes an inbuilt battery (not illustrated in the drawings), such that a supply of power from the vehicle 12 is not required. A generic battery such as a mobile battery used for portable terminals may be adopted as the inbuilt battery.

Note that the display device 124 may be configured so as to be driven by a supply of renewable energy (such as solar power, wind power, geothermal power, or regenerated power). Alternatively, in cases in which the display device 124 is attached inside the vehicle 12, the display device 124 may be supplied with power from an auxiliary power outlet or the like inside the vehicle 12. This detachable display device 124 may for example be sourced from a relevant organization at no charge or at low cost.

Figure 10:
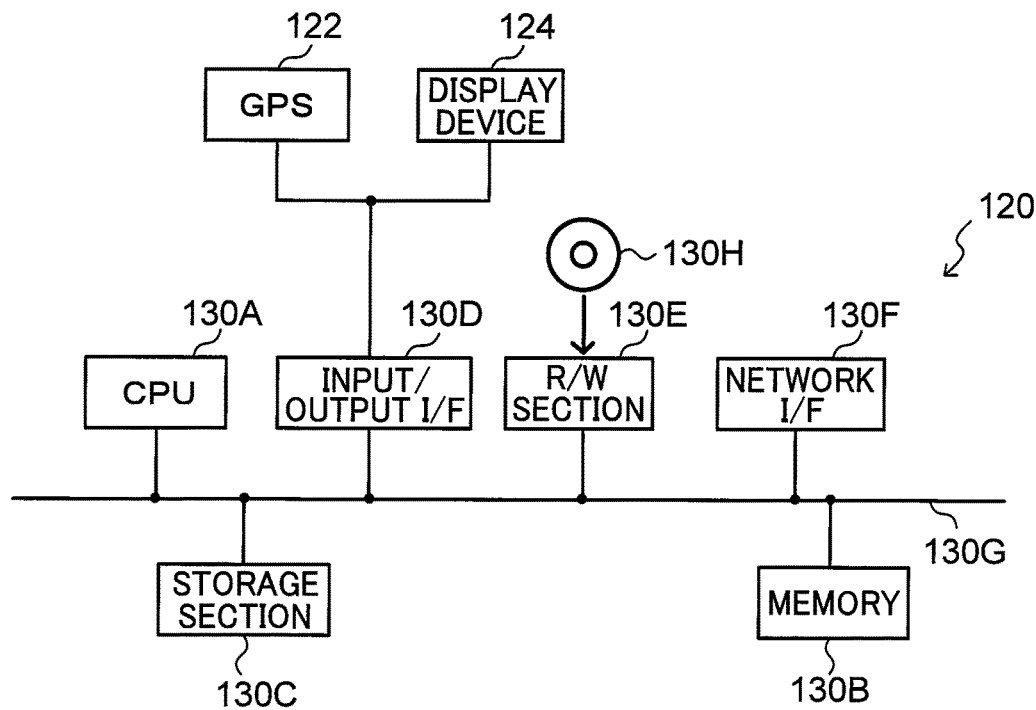
FIG. 10 is a diagram illustrating an example of configuration of a computer serving as an information processing device configuring an advertisement presentation system.

The information processing device 120 of the vehicle 12 may be implemented by a computer such as that illustrated in FIG. 10. The computer illustrated in FIG. 10 includes a CPU 130A, memory 130B serving as a temporary storage region, and a non-volatile storage section 130C. The computer also includes an input/output interface (I/F) 130D to which the GPS 122 and the display device 124 are connected, and a read/write (R/W) section 130E that controls reading and writing of data with respect to a recording medium 130H. The computer also includes a network I/F 130F that is connected to a network such as the internet. The CPU 130A, the memory 130B, the storage section 130C, the input/output I/F 130D, the R/W section 130E, and the network I/F 130F are connected to each other through a bus 130G.

The storage section 130C may be implemented by a hard disk drive (HDD), a solid state drive (SSD), flash memory, or the like. A program to cause the computer serving as the information processing device 120 to function is stored in the storage section 130C, serving as a storage medium. The CPU 130A reads the program from the storage section 130C, expands the program in the memory 130B, and sequentially executes the processes included in the program.

Figure 11:
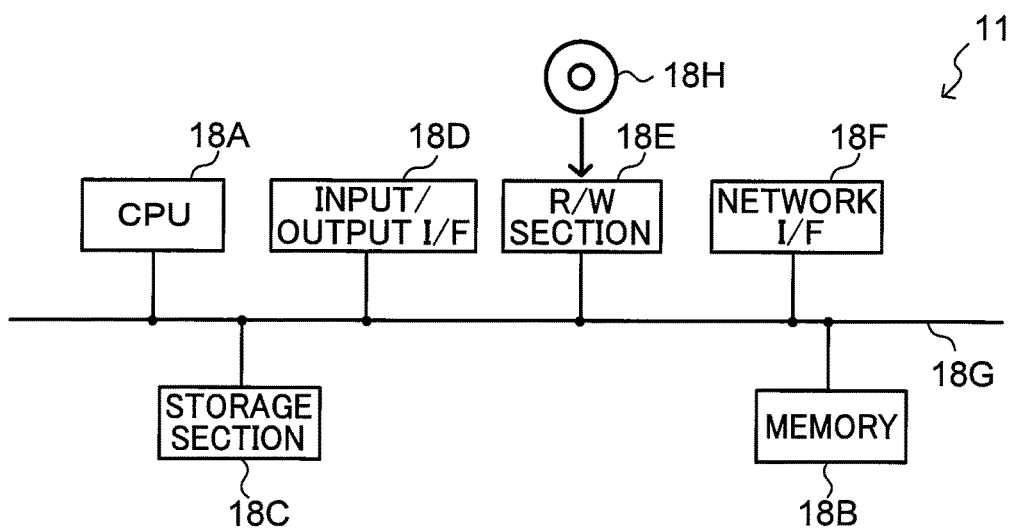
FIG. 11 is a diagram illustrating an example of configuration of a computer serving as a management server configuring an advertisement presentation system.

The management server 11 may for example be implemented by a computer such as that illustrated in FIG. 11. The computer illustrated in FIG. 11 includes a CPU 18A, memory 18B serving as a temporary storage region, and a non-volatile storage section 18C. The computer also includes an input/output interface (I/F) 18D to which an input/output device (not illustrated in the drawings) is connected, and a read/write (R/W) section 18E that controls reading and writing of data with respect to a recording medium 18H. The computer also includes a network I/F 18F that is connected to a network such as the internet. The CPU 18A, the memory 18B, the storage section 18C, the input/output I/F 18D, the R/W section 18E, and the network I/F 18F are connected to each other through a bus 18G.

The storage section 18C may be implemented by a hard disk drive (HDD), a solid state drive (SSD), flash memory, or the like. A program to cause the computer serving as the management server 11 to function is stored in the storage section 18C, serving as a storage medium. The CPU 18A reads the program from the storage section 18C, expands the program in the memory 18B, and sequentially executes the processes included in the program.

Figure 12:
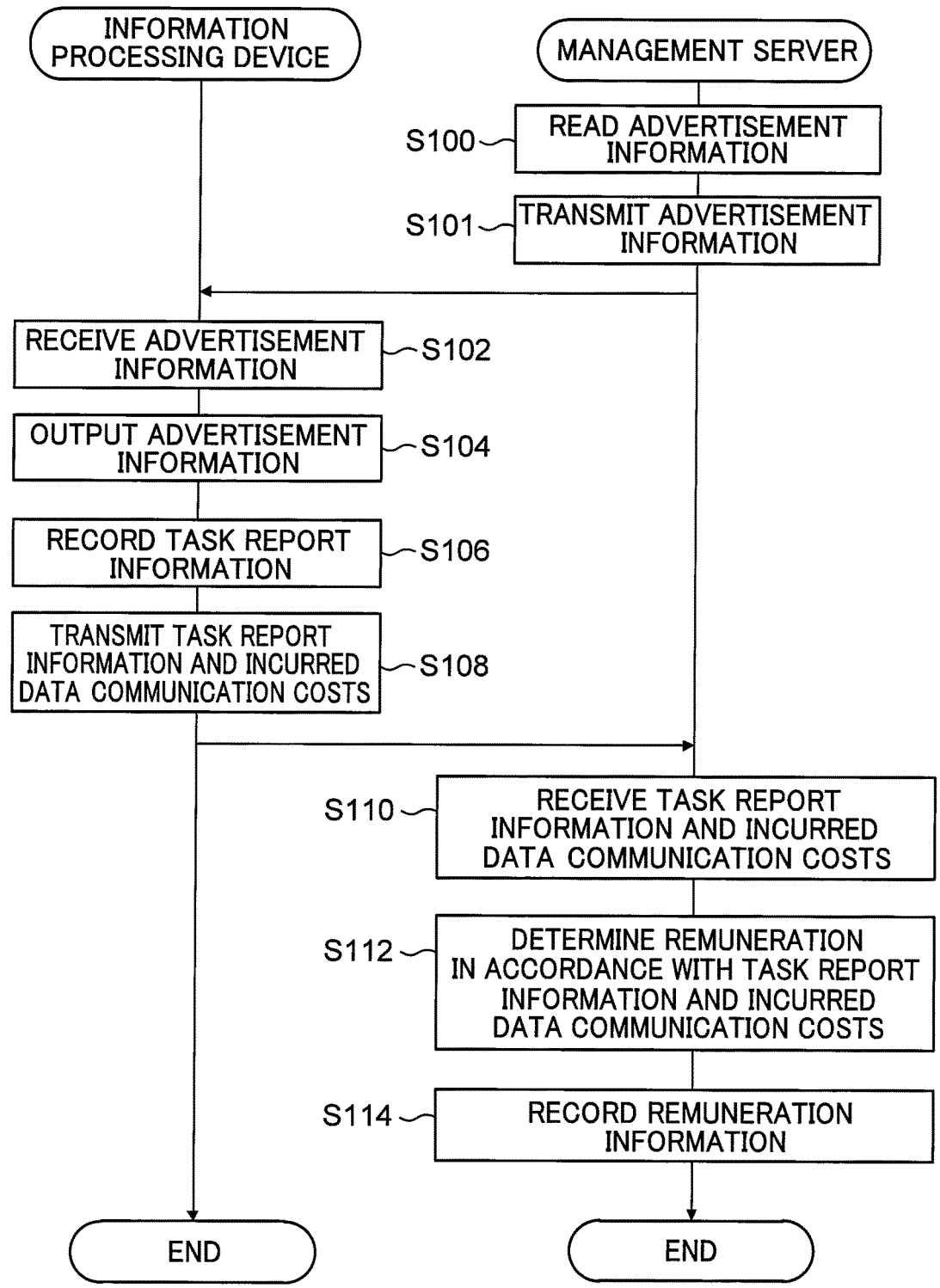
FIG. 12 is a diagram illustrating an example of a sequence executed by an advertisement presentation system of the first exemplary embodiment.

Next, explanation follows regarding operation of the advertisement presentation system 10 of the present exemplary embodiment. A sequence, illustrated in FIG. 12, is executed when the advertisement presentation system 10 is activated.

At step S100, the management server control section 112 of the management server 11 reads predetermined advertisement information from the advertisement information storage section 111.

At step S101, the management server control section 112 of the management server 11 transmits the advertisement information read at step S100 to the information processing device 120 of the vehicle 12.

At step S102, the control section 126 of the information processing device 120 of the vehicle 12 receives the advertisement information transmitted from the management server 11 at step S101.

At step S104, the control section 126 of the information processing device 120 of the vehicle 12 outputs the advertisement information received at step S102 to the display device 124. The display device 124 presents the advertisement information output from the information processing device 120 such that the advertisement information is directed outward from the vehicle 12.

At step S106, the control section 126 of the information processing device 120 of the vehicle 12 stores task report information representing an advertisement information presentation task report for the display device 124 at step S104, in a predetermined storage section (not illustrated in the drawings). For example, the control section 126 successively acquires position information from the GPS 122 for the vehicle while the advertisement information is being presented by the display device 124. The control section 126 then records travel route information indicating a history of the position information while the advertisement information was being presented by the display device 124 of the vehicle 12 as the task report information in the predetermined storage section (not illustrated in the drawings). The control section 126 also acquires the data communication costs incurred in the course of presenting the advertisement information.

At step S108, the control section 126 of the information processing device 120 of the vehicle 12 reads the task report information stored in the predetermined storage section (not illustrated in the drawings) at step S106, and transmits this task report information to the management server 11. The control section 126 also transmits the data communication costs incurred in the course of presenting the advertisement information to the management server 11. Note that the control section 126 of the information processing device 120 also transmits the vehicle ID of the vehicle 12 when this is performed.

At step S110, the management server control section 112 of the management server 11 receives the task report information and the incurred data communication costs transmitted from the information processing device 120 at step S108. Note that the management server control section 112 also receives the vehicle ID of the vehicle 12 when this is performed. The management server control section 112 records the received task report information and the incurred data communication costs in the task report information storage section 113.

At step S112, the remuneration determination section 114 of the management server 11 determines the remuneration to be paid to the owner of the vehicle 12, the organization managing the vehicle 12, or the like, in accordance with the task report information and the incurred data communication costs received at step S110. The remuneration of the present exemplary embodiment covers both the data communication costs incurred by the vehicle 12 in the course of presenting the advertisement, and advertising costs associated with presentation of the advertisement information. Note that the organization or the like that manages the vehicle 12 may be a business offering a car sharing service.

By including the communication costs in the remuneration to be paid to the party presenting the advertisement information, the party presenting the advertisement information is able to present the advertisement without worrying about the communication costs incurred in the course of presenting the advertisement information. For example, such communication costs are anticipated to be high in cases in which the advertisement information is video information. In the present exemplary embodiment, since the communication costs are covered by the remuneration for presenting the advertisement, the party presenting the advertisement information is able to present the advertisement information without worrying about the communication costs incurred in the course of presenting the advertisement information. This enables the number of vehicles 12 that present advertisement information while traveling to be increased.

At step S114, the remuneration determination section 114 of the management server 11 records remuneration information indicating the remuneration determined at step S112 in the remuneration information storage section 115.

The remuneration information for the respective vehicles held in the task report information storage section 113 is used to calculate the remuneration owed to the owner of the vehicle 12, the organization who manages the vehicle 12, or the like. Note that this remuneration may be received by the owner of the vehicle 12, the organization who manages the vehicle 12, or the like, or by the driver of the vehicle 12. Alternatively, the remuneration may be received by the company who provided the display device 124. Alternatively, the remuneration may be divided between these parties.

As described above, the advertisement presentation system of the present exemplary embodiment includes the one or more detachable display devices provided to a vehicle, the information processing device, and the management server. The information processing device of the advertisement presentation system acquires advertisement information representing an advertisement, and outputs the acquired advertisement information to the display device. The display device presents the advertisement information output from the information processing device such that the advertisement information is directed outward from the vehicle. The information processing device then transmits task report information indicating the task report for the advertisement information presentation using the display device to the management server. The management server then determines the remuneration so as to cover the incurred data communication costs and the advertising costs associated with presentation of the advertisement information in accordance with the task report information transmitted from the information processing device. An advertisement can be presented from a vehicle mounted with the detachable display device in this manner. Furthermore, the remuneration to be paid in exchange for presenting the advertisement information covers both the incurred data communication costs and the advertising costs associated with presentation of the advertisement information, thereby enabling the party presenting the advertisement information to present the advertisement information without worrying about communication costs. This enables the wider adoption of vehicles that present advertisements from a display device while traveling.

In cases in which the detachable display device is provided inside the cabin of the vehicle with the display face of the display device facing outward from the vehicle, the display device is less liable to come off than in cases in which the display device is provided to an exterior location of the vehicle. Moreover, in cases in which the display device is provided inside the cabin of the vehicle, even supposing the display device were to come off, any consequences in the surroundings would be minor. Providing the display device inside the cabin of the vehicle also facilitates compliance with various legal regulations. Providing the display device inside the cabin of the vehicle also enables the display device to be suppressed from being mistaken for a headlight or the like.

Second Exemplary Embodiment

Next, explanation follows regarding a second exemplary embodiment. An advertisement presentation system of the second exemplary embodiment differs from that of the first exemplary embodiment in the respect that plural display devices are provided to a vehicle, and different advertisement information is presented by each of the plural display devices.

The display devices of the present exemplary embodiment are attachable and detachable, and are for example capable of being installed at the front of a vehicle, the rear of the vehicle, the sides of the vehicle, or the like. The following locations are examples of potential locations where the display devices may be attached.

Vehicle front: Grille, bonnet
Vehicle rear: Back door, back window
Vehicle side: Side panels
Other locations: Roof In the advertisement presentation system of the second exemplary embodiment, different advertisement information is presented by the plural display devices provided to the vehicle. For example, in the advertisement presentation system of the second exemplary embodiment, a display device installed at the front of the vehicle may present advertisement information designed to be presented to oncoming vehicles. Moreover, in the advertisement presentation system of the second exemplary embodiment, a display device installed at the rear of the vehicle may present advertisement information designed to be presented to vehicles following behind the vehicle. Furthermore, in the advertisement presentation system of the second exemplary embodiment, a display device installed on one side of the vehicle may present advertisement information targeted at pedestrians. This enables relevant advertisement information to be presented from the respective locations of the vehicle, enabling the promotional efficacy thereof to be enhanced. Specific explanation follows regarding this.

Figure 13:
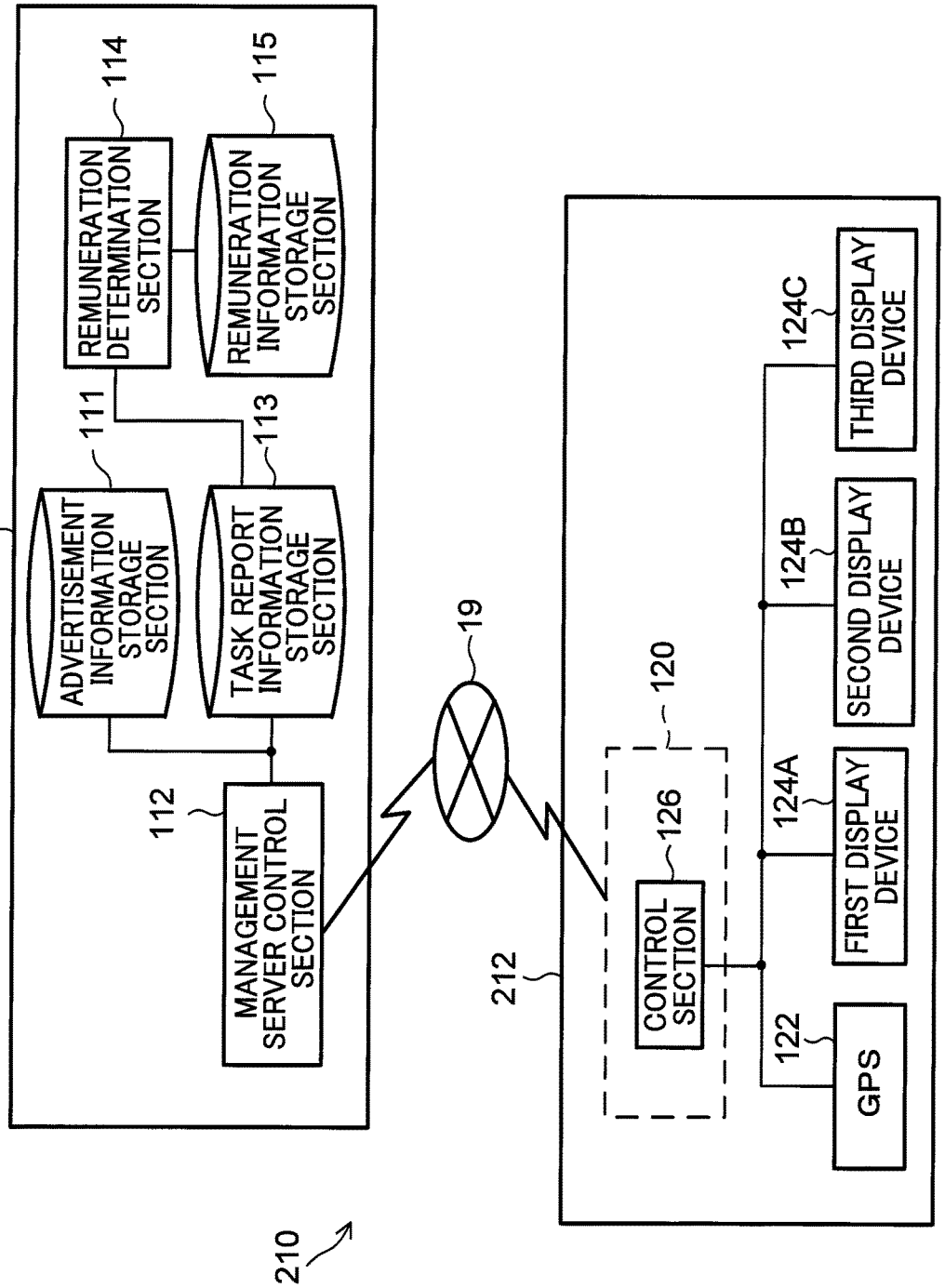
FIG. 13 is a block diagram schematically illustrating an advertisement presentation system according to a second exemplary embodiment.

FIG. 13 is a block diagram illustrating an example of configuration of an advertisement presentation system 210 according to the second exemplary embodiment. As illustrated in FIG. 13, a vehicle 212 of the advertisement presentation system 210 includes a first display device 124A, a second display device 124B, and a third display device 124C, serving as plural display devices.

The first display device 124A, the second display device 124B, and the third display device 124C are installed at different locations on the vehicle 12. Moreover, the first display device 124A, the second display device 124B, and the third display device 124C each present different advertisement information directed outward from the vehicle.

Figure 14:
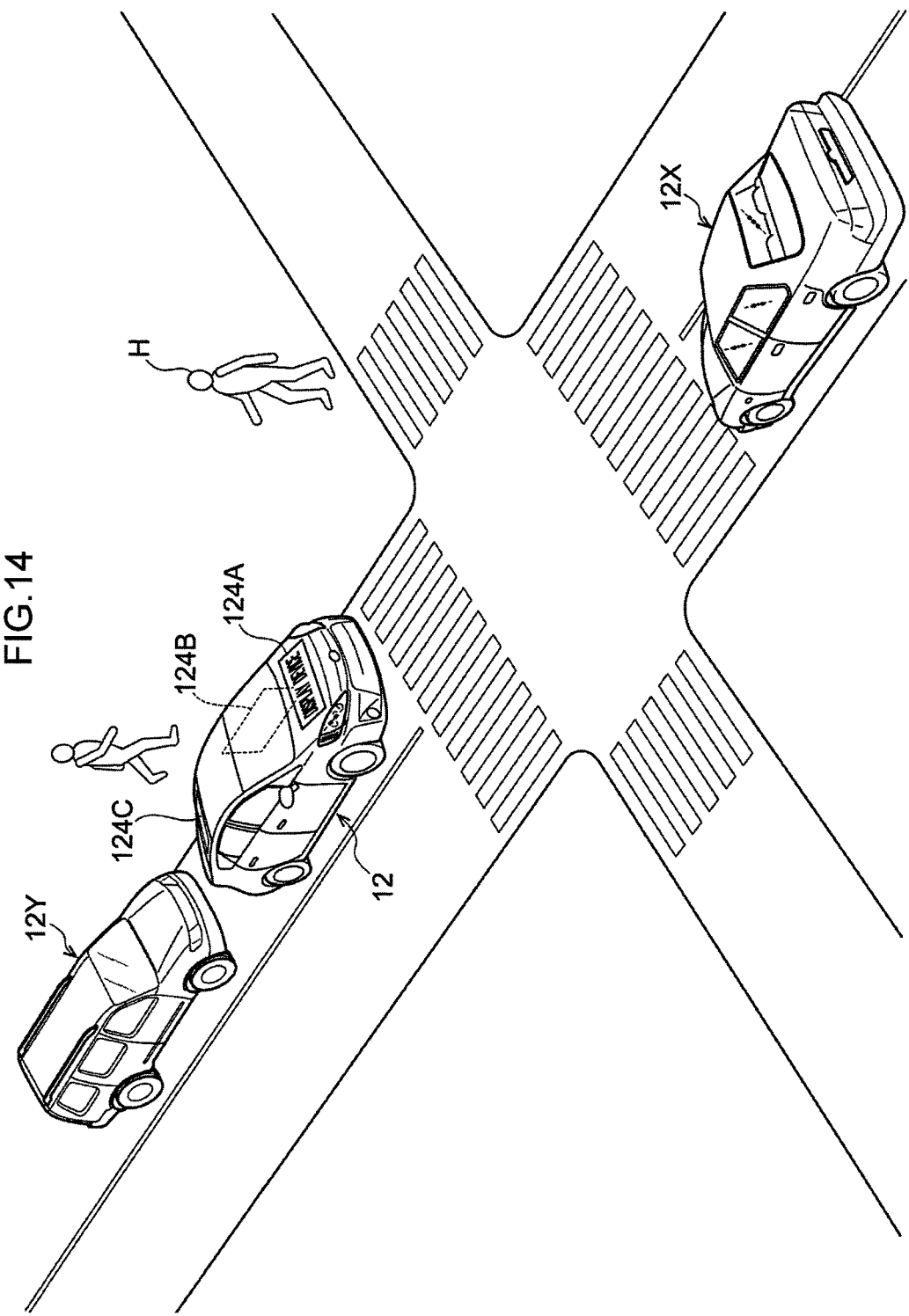
FIG. 14 is a diagram to explain an example of operation of an advertisement presentation system of the second exemplary embodiment.
Figure 15:
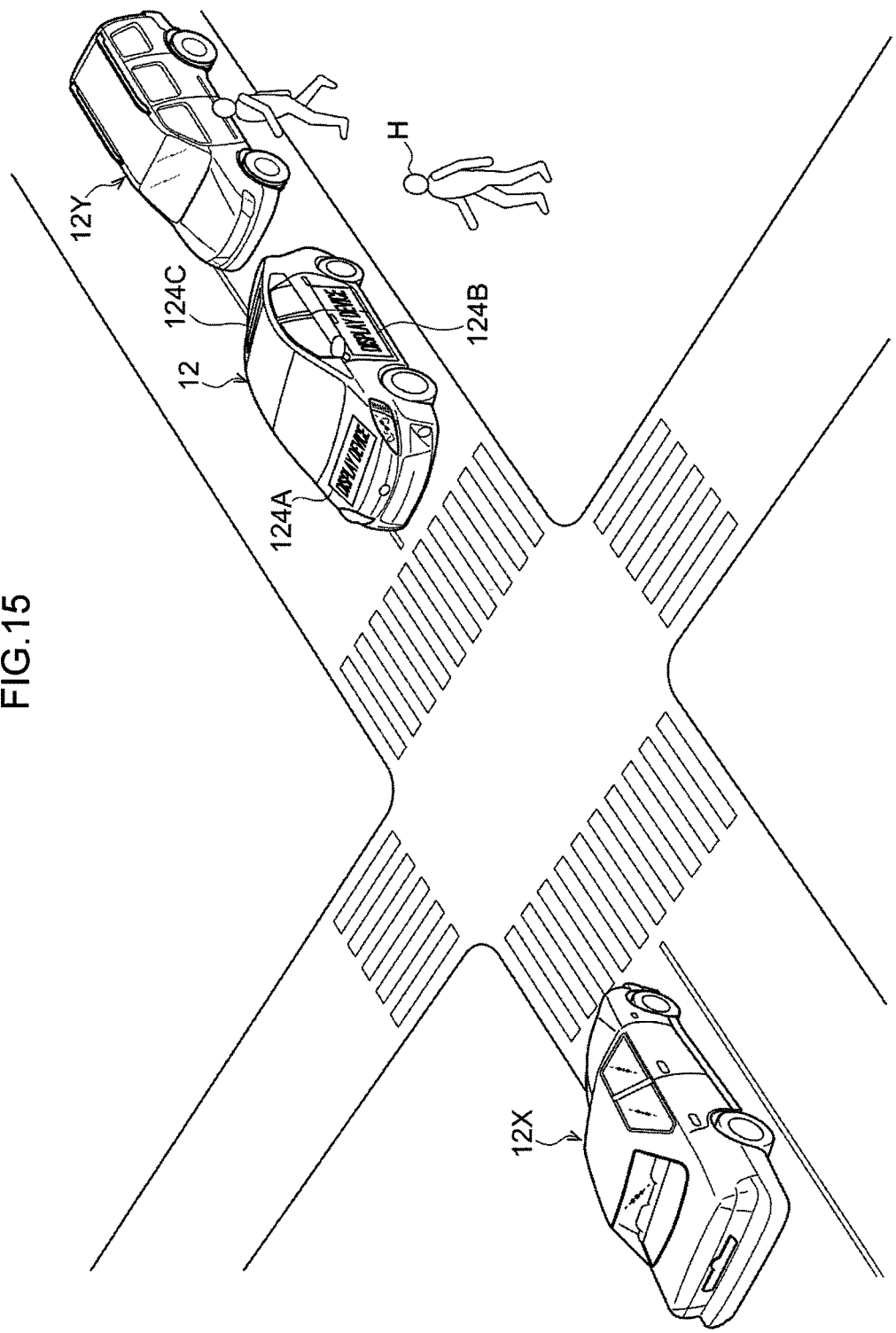
FIG. 15 is a diagram to explain an example of operation of an advertisement presentation system of the second exemplary embodiment.

FIG. 14 is a diagram to explain the advertisement information presented by the respective display devices of the vehicle 212 of the second exemplary embodiment. As illustrated in FIG. 14, the first display device 124A is attached to the bonnet of the vehicle 212. The second display device 124B is attached to a door of the vehicle 212. The third display device 124C is attached to the back window of the vehicle 212. FIG. 15 is a diagram corresponding to FIG. 14 when viewed from a different angle.

In this case, for example, the first display device 124A presents advertisement information targeted at a vehicle 12X, this being an oncoming vehicle. The second display device 124B presents advertisement information targeted at a pedestrian H. The third display device 124C presents advertisement information targeted at a following vehicle 12Y.

The control section 126 of the information processing device 120 acquires the advertisement information transmitted from the management server 11 for the display devices at the respective locations, and performs control such that advertisement information targeted at the vehicle 12X is presented by the first display device 124A. The control section 126 also performs control such that advertisement information targeted at the pedestrian H is presented by the second display device 124B. The control section 126 also performs control such that advertisement information targeted at the following vehicle 12Y is presented by the third display device 124C. Note that although not illustrated in the drawings, a display device may be attached to the roof of the vehicle 212, and advertisement information targeted at occupants of high-rise buildings may be presented by this display device.

In this case, for example, even if the advertisement information is for the same organization, the advertisement information may be set according to the respective locations on the vehicle 212.

For example, even if advertisements are for the same organization, the advertisement content may be varied according to the respective locations on the vehicle, as set out in the table below.

TABLE 1

| Location on vehicle | Restaurant | Clinic | ... |
|---|---|---|---|
| Front | Targeted at oncoming vehicles "Perform a U-turn at next traffic lights" | Targeted at oncoming vehicles "Perform a U-turn at next traffic lights" | ... |
| Left/right | Targeted at pedestrians "T burger for a limited time only" | Targeted at pedestrians "Closed this afternoon" | ... |
| Rear | Targeted at vehicles following behind "Drive-through available" | Targeted at vehicles following behind "Parking full" | ... |
| Roof | Targeted at high-rise building occupants "We deliver to your office" | Targeted at high-rise building occupants "Group checkups OK" | ... |

For example, in a case in which the advertiser is a restaurant, the advertisement information "Perform a U-turn at next traffic lights", targeted at oncoming vehicles, is presented by the first display device 124A. The advertisement information "T burger for a limited time only", targeted at pedestrians, is presented by the second display device 124B. The advertisement information "Drive-through available", targeted at following vehicles, is presented by the third display device 124C. The advertisement information "We deliver to your office", targeted at high-rise building occupants, is presented by a display device 124 installed on the roof of the vehicle 212.

Thus, different advertisement information is presented from the respective locations of the vehicle 212 of the second exemplary embodiment. Presenting advertisement information that is adapted for a target located at a position corresponding to the direction in which the advertisement is presented further enhances the promotional efficacy.

As described above, the one or more detachable display devices provided to the vehicle of the advertisement presentation system according to the second exemplary embodiment include the first display device provided at a first location on the vehicle, the second display device provided at a second location on the vehicle, and the third display device provided at a third location on the vehicle. The first display device presents first advertisement information directed outward from the vehicle, the second display device presents second advertisement information directed outward from the vehicle, and the third display device presents third advertisement information directed outward from the vehicle. This enables the vehicle to present advertisements that take into consideration the direction in which each advertisement is being presented. This enables the promotional efficacy to be enhanced.

Note that although the processing performed by the respective devices in the above exemplary embodiments is described as software processing performed by executing a program, this processing may be performed by hardware. Alternatively, the processing may be performed by a combination of both software and hardware. Alternatively, the program stored in the ROM may be stored in and distributed using various storage media.

Further, the technology disclosed within is not limited to the above description, and obviously various other modifications may be implemented within a range not departing from the spirit of the present disclosure.

For example, when no advertisement information is being displayed, an issue arises in that that display device becomes a black screen, which is detrimental to the appearance of the vehicle. Thus, the information processing device of the advertisement presentation system may perform control so as to determine a background color of an on-screen display of the display device based on information regarding the body color of the vehicle. For example, in cases in which the display device is attached to an exterior location of the vehicle, the control section of the information processing device may set the base color of the display device based on a vehicle color code. More specifically, the body color of the vehicle may be imaged using a camera or the like prior to fitting the display device, and the base color of the display device may be set or adjusted based on information regarding the color of the vehicle obtained thereby.

Although examples have been given in the above exemplary embodiments in which the display device and the information processing device are configured by separate units, there is no limitation thereto. For example, the display device may have equivalent functionality to the information processing device.

Although examples have been given in the above exemplary embodiments in which information regarding the incurred data communication costs is transmitted from the information processing device of the vehicle to the management server, there is no limitation thereto. For example, the management server may acquire the incurred data communication costs from a data communications company or the like.

The disclosures of Japanese Patent Application No. 2020-4769 filed on Jan. 15, 2020 are incorporated herein by reference in their entirety.

All publications, patent applications, and technical standards mentioned in this specification are herein incorporated by reference to the same extent as if each individual publication, patent application, or technical standard was specifically and individually indicated to be incorporated by reference.

The invention claimed is:

1. An advertisement presentation system, comprising:
   at least one display device that is detachably provided at a vehicle and that includes a first processor;
   an information processing device including a second processor; and
   a management device including a third processor;
   the second processor of the information processing device being configured to acquire advertisement information representing an advertisement, and to output the acquired advertisement information to the first processor of the at least one display device;
   the first processor of the at least one display device being configured to present the advertisement information output from the second processor of the information processing device such that the advertisement information is directed outward from the vehicle;
   the second processor of the information processing device being configured to
      acquire task report information from the first processor of the at least one display device while the advertisement information is presented on the at least one display device by the first processor, the task report information representing a presentation task report for the advertisement information, wherein the task report information includes (i) a travel route actually traveled by the vehicle while the advertisement information was being output and (ii) a time of the advertisement information being output, and
      transmit the task report information to the third processor of the management device; and
   the third processor of the management device being configured to determine remuneration to cover both incurred data communication costs and advertising costs associated with presentation of the advertisement information, in accordance with the task report information transmitted from the second processor of the information processing device, wherein the determined remuneration is recorded in a storage medium.

2. The advertisement presentation system of claim 1, wherein the at least one display device is provided inside a cabin of the vehicle such that a display face of the at least one display device faces outward from the vehicle.

3. The advertisement presentation system of claim 1, wherein the at least one display device detachably provided at the vehicle includes a first display device provided at a first location on the vehicle and a second display device provided at a second location on the vehicle;
   the first display device is configured to present first advertisement information directed outward from the vehicle; and
   the second display device is configured to present second advertisement information directed outward from the vehicle.

4. The advertisement presentation system of claim 2, wherein the at least one display device detachably provided at the vehicle includes a first display device provided at a first location on the vehicle and a second display device provided at a second location on the vehicle;
   the first display device is configured to present first advertisement information directed outward from the vehicle; and
   the second display device is configured to present second advertisement information directed outward from the vehicle.

5. The advertisement presentation system of claim 1, wherein the information processing device is a terminal configured to be operated by an occupant of the vehicle.

6. The advertisement presentation system of claim 2, wherein the information processing device is a terminal configured to be operated by an occupant of the vehicle.

7. The advertisement presentation system of claim 3, wherein the information processing device is a terminal configured to be operated by an occupant of the vehicle.

8. The advertisement presentation system of claim 4, wherein the information processing device is a terminal configured to be operated by an occupant of the vehicle.

9. The advertisement presentation system of claim 1, wherein the second processor of the information processing device is configured to determine a background color of an on-screen display of the at least one display device based on information regarding a body color of the vehicle.

10. The advertisement presentation system of claim 2, wherein the second processor of the information processing device is configured to determine a background color of an on-screen display of the at least one display device based on information regarding a body color of the vehicle.

11. The advertisement presentation system of claim 3, wherein the second processor of the information processing device is configured to determine a background color of an on-screen display of the at least one display device based on information regarding a body color of the vehicle.

12. The advertisement presentation system of claim 4, wherein the second processor of the information processing device is configured to determine a background color of an on-screen display of the at least one display device based on information regarding a body color of the vehicle.

13. The advertisement presentation system of claim 5, wherein the second processor of the information processing device is configured to determine a background color of an on-screen display of the at least one display device based on information regarding a body color of the vehicle.

14. The advertisement presentation system of claim 6, wherein the second processor of the information processing device is configured to determine a background color of an on-screen display of the at least one display device based on information regarding a body color of the vehicle.

15. The advertisement presentation system of claim 1, wherein:
   the third processor of the management device is configured to transmit the advertisement information to the second processor of the information processing device;
   the second processor of the information processing device is configured to receive the advertisement information transmitted from the third processor of the management device; and
   the incurred data communication costs include communication costs arising in the course of as a result of the information processing device receiving the advertisement information.

16. The advertisement presentation system of claim 2, wherein:
   the third processor of the management device is configured to transmit the advertisement information to the second processor of the information processing device;
   the second processor of the information processing device is configured to receive the advertisement information transmitted from the third processor of the management device; and the incurred data communication costs include communication costs arising in the course of as a result of the information processing device receiving the advertisement information.

17. The advertisement presentation system of claim 3, wherein:
the third processor of the management device is configured to transmit the advertisement information to the second processor of the information processing device;
the second processor of the information processing device is configured to receive the advertisement information transmitted from the third processor of the management device; and
the incurred data communication costs include communication costs arising in the course of as a result of the information processing device receiving the advertisement information.

18. The advertisement presentation system of claim 4, wherein:
the third processor of the management device is configured to transmit the advertisement information to the second processor of the information processing device;
the second processor of the information processing device is configured to receive the advertisement information transmitted from the third processor of the management device; and
the incurred data communication costs include communication costs arising in the course of as a result of the information processing device receiving the advertisement information.

19. The advertisement presentation system of claim 5, wherein:
the third processor of the management device is configured to transmit the advertisement information to the second processor of the information processing device;
the second processor of the information processing device is configured to receive the advertisement information transmitted from the third processor of the management device; and
the incurred data communication costs include communication costs arising in the course of as a result of the information processing device receiving the advertisement information.

20. An advertisement presentation method executed in an advertisement presentation system including at least one display device that is detachably provided at a vehicle and that includes a first processor, an information processing device including a second processor, and a management device including a third processor, the advertisement presentation method comprising:
acquiring, by the second processor of the information processing device, advertisement information representing an advertisement;
outputting the acquired advertisement information from the second processor of the information processing device to the first processor of the at least one display device;
presenting, by the first processor of the at least one display device, the advertisement information output from the second processor of the information processing device such that the advertisement information is directed outward from the vehicle;
acquiring, by the second processor of the information processing device, task report information from the first processor of the at least one display device while the advertisement information is presented on the at least one display device by the first processor, the task report information representing a presentation task report for the advertisement information, wherein the task report information includes (i) a travel route actually traveled by the vehicle while the advertisement information was being output and (ii) a time of the advertisement information being output;
transmitting the task report information from the second processor of the information processing device to the third processor of the management device;
determining, through the third processor of the management device, remuneration to cover both incurred data communication costs and advertising costs associated with presentation of the advertisement information, in accordance with the task report information transmitted from the second processor of the information processing device; and
recording the determined remuneration in a storage medium.

\* \* \* \* \*